US 6,574,964 B1

(12) United States Patent
Häggander et al.

(10) Patent No.: US 6,574,964 B1
(45) Date of Patent: Jun. 10, 2003

(54) ROCKET NOZZLE CONTOUR FOR FLOW SEPARATION CONTROL AND SIDE LOAD REDUCTION

(75) Inventors: Jan Häggander, Trollhättan (SE); Jan Östlund, Lidköping (SE); Mats Olofsson, Trollhättan (SE); John Änggård, Johanneshov (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 09/856,610

(22) PCT Filed: Dec. 4, 1998

(86) PCT No.: PCT/SE98/02222
§ 371 (c)(1),
(2), (4) Date: May 23, 2001

(87) PCT Pub. No.: WO00/34641
PCT Pub. Date: Jun. 15, 2000

(51) Int. Cl.[7] ................................................. F02K 1/00
(52) U.S. Cl. ..................................... 60/770; 239/265.11
(58) Field of Search ......................... 60/770; 239/265.11

(56) References Cited

U.S. PATENT DOCUMENTS

| 3,352,495 A | 11/1967 | Fischer |
| 3,394,549 A | 7/1968 | Sutor |
| 4,821,962 A | 4/1989 | Venables et al. ........ 239/265.15 |
| 4,947,644 A | 8/1990 | Hermant ....................... 60/257 |
| 5,450,720 A | 9/1995 | Vuillamy et al. .............. 60/271 |
| 6,318,071 B2 * | 11/2001 | Haggander et al. ..... 239/265.11 |
| 6,324,833 B1 * | 12/2001 | Singer et al. ................ 138/132 |

FOREIGN PATENT DOCUMENTS

| EP | 0626513 | 11/1994 |
| EP | 0894031 | 2/1999 |
| EP | 0924041 | 6/1999 |
| WO | 9729277 | 8/1997 |
| WO | 9812429 | 3/1998 |

* cited by examiner

Primary Examiner—Charles G. Freay
(74) Attorney, Agent, or Firm—Dickstein Shapiro Morin & Oshinsky LLP

(57) ABSTRACT

The invention refers to a full-flow rocket nozzle having a longitudinal contour essentially corresponding to a parabola. For obtaining a flow separation control and also a side load reduction the invention suggests that the parabola contour shape from the point of 50% expansion ratio onwards or more distant from the throat of the nozzle is changing over into (i) strictly conical shape having an angle to the center line of between 15° and 25°, (ii) a slight outward curvature, i.e. implying a contour shape with positive $2^{nd}$ derivative of the radius r, or (iii) a slight inward curvature, i.e. with a negative $2^{nd}$ derivative of r but lying externally of the parabola contour, in the last case the $3^{rd}$ derivative of r being constantly equal to zero (0).

2 Claims, 2 Drawing Sheets

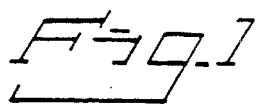
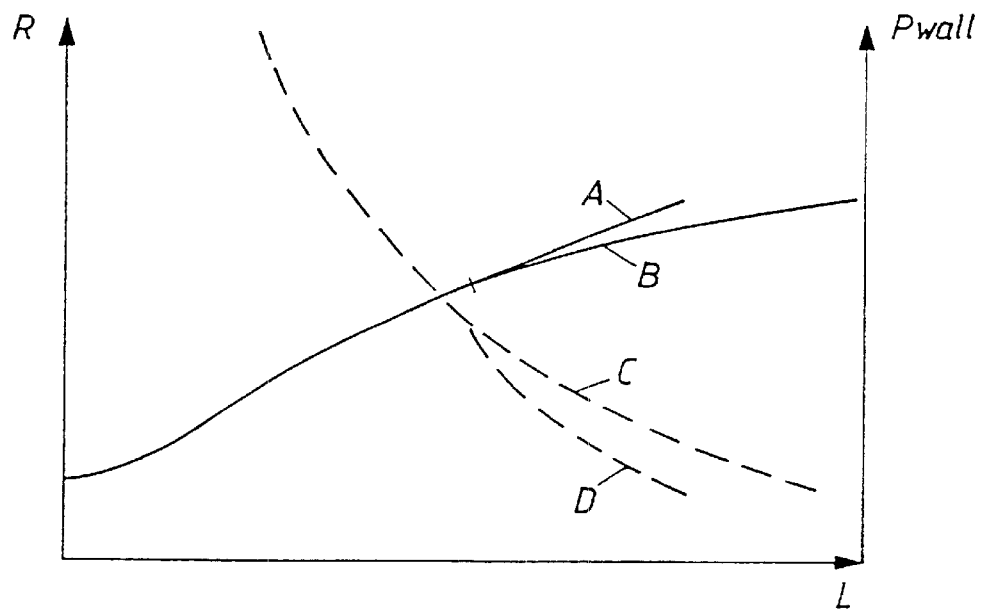
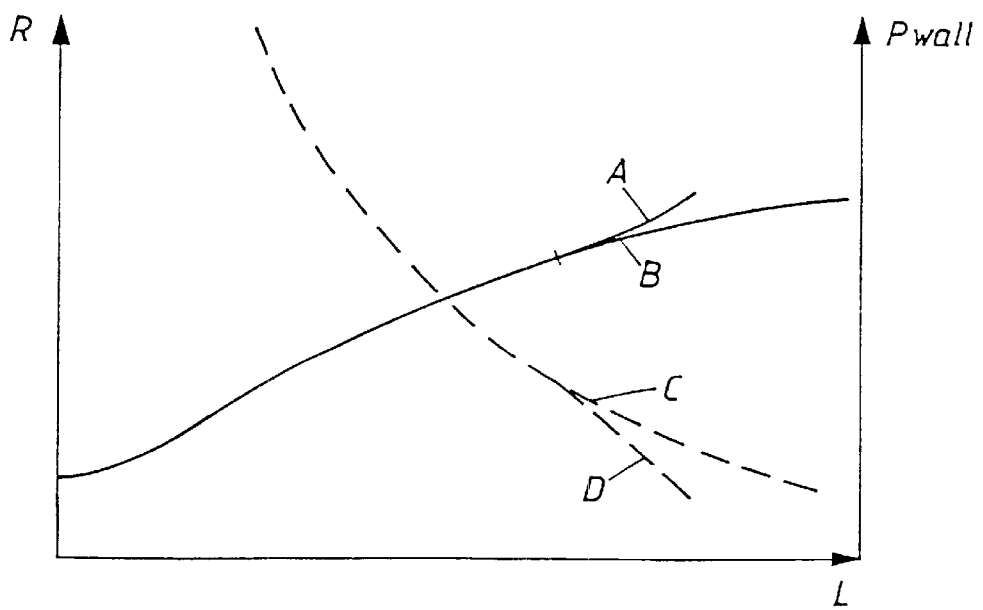

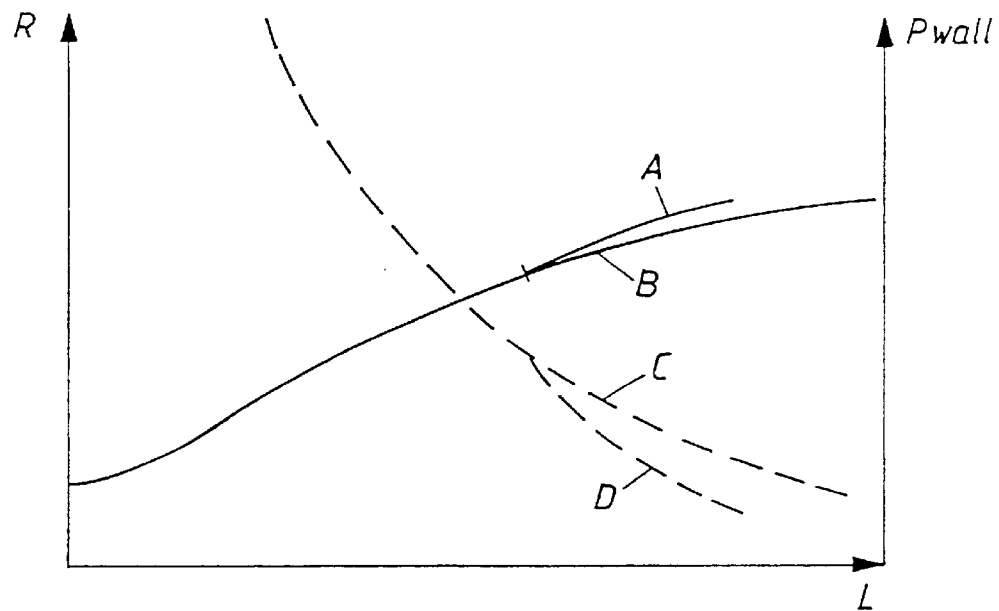
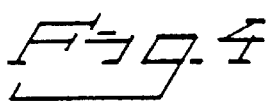
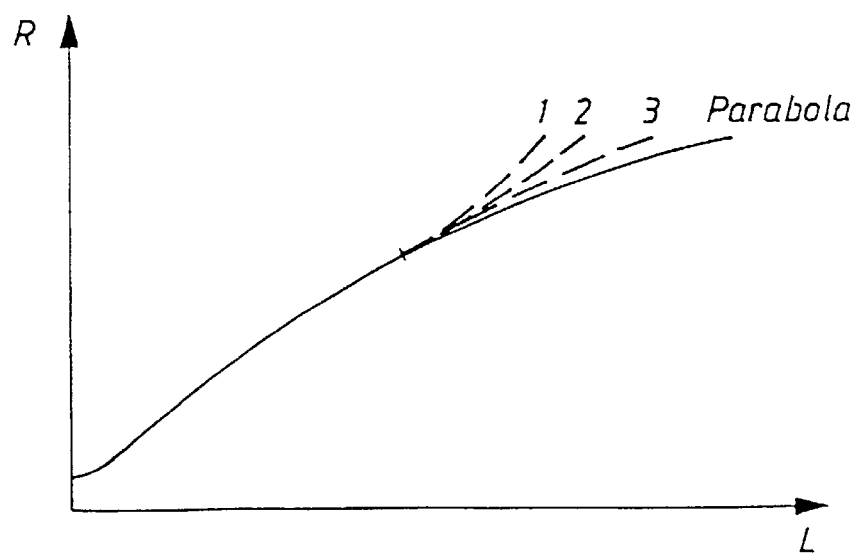

ROCKET NOZZLE CONTOUR FOR FLOW SEPARATION CONTROL AND SIDE LOAD REDUCTION

BACKGROUND OF THE INVENTION

1. Field of the Invention

The present invention refers to a full-flow rocket nozzle having a longitudinal contour essentially corresponding to a parabola.

2. Description of the Related Art

The function of the rocket nozzle is to expand and accelerate the gas to high velocity and thereby give thrust efficiency and payload capacity. The capability to expand the gas is limited by the fact that the ambient pressure at sea level forces the flow to separate. The separated flow generates unsteady aerodynamical forces. These forces set the limit for the size of the nozzle and hence the limits for nozzle efficiency in vacuum operation. For thermal reasons first stage nozzles may be run separated towards the exit. This means that if the unsteady aerodynamical forces could be reduced to an acceptable level the nozzles could be run continuously separated at the ground and in ascent. This would provide for the possibility to make larger and more effective nozzles.

Normally, the nozzle contour is a continuous smooth contour optimized to minimize performance loss in shocks and divergence of the flow. The contour is typically described by a parabolic function. Hitherto the nozzle contours have not been optimized for separated flow at sea level since no side load control measures to allow this has been known.

Attempts have been made to influence indirectly on the nozzle contour. Such prior attempts have included for example an exit diffuser means, see EP 626 513 A1, a trip ring, an abladeable or ejectable insert, periodically variable radius, see PCT/SE96/00176, slotted nozzles, see U.S. Pat. No. 5,450,720, injection of gas, see U.S. Pat. No. 4,947,644, an exit ejector means, see EP 894 031 and a mechanism for extendible exit nozzle, see EP 924 041. A flow separation control device with a modified nozzle contour is known from U.S. Pat. No. 3,394,549.

Therefore, prior full flow nozzles have a limited expansion ratio that limits the performance. Said performance is optimized considering the flow separation margin and the side loads.

All the measures mentioned above are adapted to be used in combination with a parabola or bell contour. This leads to long and heavy nozzles. The net performance gain including weight increase is moderate and is decreasing as the nozzles are made very large. The bell nozzle has, towards the exit, a flat gradient in wall pressure vs. axial length as it is optimized for performance. However, this is contradictory to optimizing for side loads. The weight of the nozzle has a negative impact on the weight and complexity of the engine system and the rocket thrust structure. The size of the nozzle may not be compatible with the space available in test facilities, in rocket assembly and at rocket launch sites.

SUMMARY OF THE INVENTION

Thus the main object of the present invention is to suggest a nozzle contour which eliminates the aforementioned drawbacks. The basic idea of the present invention is that the effective parabolic contour is kept for as long portion of the nozzle contour as where the pressure is still high and has a strong impact on the resulting performance. Thereafter, combinations of nozzle contours are suggested. The present invention thus is mainly distinguished in that the parabola contour shape from the point of 50% expansion ratio onwards or more distant from the throat of the nozzle is changing over into (i) a strictly conical shape having an angle to the center line of between 15° and 25°, (ii) a slight outward curvature, i.e. implying a contour shape with positive $2^{nd}$ derivative of the radius r, or (iii) a slight inward curvature, i.e. with a negative $2^{nd}$ derivative of r but lying externally of the parabola contour, in the last case the $3^{rd}$ derivative of r being constantly equal to zero (0).

BRIEF DESCRIPTION OF THE DRAWINGS

FIGS. 1–4 are illustrations of various embodiments of the invention.

DETAILED DESCRIPTION OF THE PREFERRED EMBODIMENTS

Owing to the invention the area ratio of the lower part of the nozzle is made to grow faster in changing over to a modified contour. The pressure level is here lower and the performance is not drastically hurt. In the same area it is interesting to reduce the pressure gradient vs. length of the nozzle to reduce the aeroelastical coupling, which is also achieved by this arrangement.

With the invention, nozzles can be designated which are distinctly different from present contours. The invention allows the use of larger nozzles at sea level which leads to increased payload. Furthermore, the invention minimizes the length and thereby reduces the weight, the envelope and the side load momentum of the mechanical forces for the enlarged nozzle in comparison to non-enlarged nozzles. The invention provides for an increase of the derivative of pressure vs. nozzle length at the axial location where the side load is strong which reduces the side loads. Finally, the invention improves the possibilities of film cooling since the film strength is shortened compared to an enlarged bell nozzle.

The contour optimization may not by itself reach the requirements to allow running nozzles with separated flow continuously at sea level. However, the circumstances to reach the requirements by a flow separation device are improved.

For a typical first stage nozzle modified to utilize the advantages of separated flow the performance budget could in principle be exemplified as below. The table is representative for the three posted contours. The comparison is made between a first stage nozzle modified to exit area ratio of 170%. All contributions to performance have been recalculated to specific impulse using approximate trade factors for Vulcain 5.

The sea level Isp (s) is increased by the fact that the pressure in the separated zone is increased as the recirculating zone is wider. The sea level Isp is increased, which could be recalculated to a small increase of Isp vacuum [Isp=specific impulse].

The nozzle wet surface area is reduced. This will decrease the friction loss, which gives a positive contribution to Isp vacuum.

Engine weight is reduced from reduction of the nozzle length. The weight reduction could be recalculated to Isp vacuum.

Engine cost reduction could be recalculated to Isp vacuum.

Summary of performance gains:

|  | ISD vacuum contribution |
| --- | --- |
| Δ Isp sea level | positive |
| Δ Isp friction | positive |
| Δ Isp weight | positive |
| Δ Isp cost | positive |

The negative contributions to Isp vac (divergence loss) could be allowed to increase within the sum of positive contribution with maintained rocket cost-effectiveness compared to the ideal contour for performance.

According to the invention, the lever arm for side load momentum is reduced by the order of 20%. The side load could be expected to decrease by this percentage. The side load will also be decreased by the positive effect from the increased axial pressure gradient outlet.

All the proposed contours give a more rapid expansion of the gas with less pressure recovery at the nozzle exit. This means that the heat load is reduced. This could be very important when adding modification kits to existing nozzles.

By way of example the invention will be further described below with reference to the accompanying drawing, in which FIG. 1 diagrammatically illustrates a truncated bell nozzle with added conical portion. FIG. 2 illustrates a truncated bell nozzle with added part with positive second derivative of r vs. length, FIG. 3 shows also diagrammatically a truncated bell nozzle with added part with negative $2^{nd}$ derivative of r vs. length but with constant $2^{nd}$ derivative of angle equal to zero and FIG. 4 shows a comparison between the prior and the inventive contours.

The standard practice is to use negative $2^{nd}$ derivative of r vs. length when determining the parabola contour shape of the rocket nozzle. On the contrary, the conical nozzle is a special case with constant derivative. Therefore the discussion for the conical portion is valid also here. The loss in Isp may be smaller since the effective bell shape could be kept longer and still reaching the desired outlet area exit ratio.

Similarly, as illustrated in FIG. 3, the contour is selected such that the $2^{nd}$ derivative of r vs. length is negative but with constant $2^{nd}$ derivative of angle equal to zero.

In FIG. 4 the contours shown in FIGS. 1–3 are superposed for the sake of comparison.

In the drawings, FIGS. 1–3, A is a modified nozzle contour, B is the basic radius, C is the basic pressure and D is the modified pressure.

What is claimed is:

1. A full-flow rocket nozzle with a throat and an exit, said nozzle having a longitudinal contour essentially corresponding to a parabola at said throat, said contour having a variable radius r at any point along a length of said nozzle between said throat and said exit, r being an axial distance to said contour from an imaginary centerline along the length of the nozzle, wherein the contour changes shape from a point of 50% expansion ratio along the length of the nozzle and continuing along said nozzle away from the throat towards the exit, so that the contour (i) becomes strictly conical in shape having an angle with respect to the center line of between 15° and 25°, (ii) has a slight outward curvature with a positive $2^{nd}$ derivative of the radius r with respect to said length, or (iii) has a slight inward curvature with a negative $2^{nd}$ derivative of r with respect to said length, said inward curvature lying externally of the parabola contour and the $3^{rd}$ derivative of r being constantly equal to zero.

2. A full-flow rocket nozzle according to claim 1, wherein a transition area at the changing point in contour shape is formed as a step in the contour of 0–6°.

\* \* \* \* \*